(12) United States Patent
Wu (10) Patent No.: US 6,894,910 B1
(45) Date of Patent: May 17, 2005

(54) DYNAMIC DUTY CYCLE CLAMPING FOR SWITCHING CONVERTERS

(75) Inventor: Keng Chih Wu, Cranbury, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 74 days.

(21) Appl. No.: 10/426,227

(22) Filed: Apr. 30, 2003

Related U.S. Application Data (60) Provisional application No. 60/451,576, filed on Mar. 3, 2003.

(51) Int. Cl.[7] .............................. H02M 7/10; G05F 1/40
(52) U.S. Cl. ........................... 363/79; 363/80; 323/268
(58) Field of Search ................................ 323/282, 285, 323/286, 225, 222, 272, 268; 363/97, 68, 46, 50, 65, 20; 361/18, 19

(56) References Cited

U.S. PATENT DOCUMENTS 4,218,647 A * 8/1980 Haas .......................... 323/268
6,326,771 B1 * 12/2001 Popescu-Stanesti ......... 320/139

* cited by examiner

Primary Examiner—Rajnikant B. Patel
(74) Attorney, Agent, or Firm—Duane Morris LLP (57) ABSTRACT

A method and system for dynamic limiting of the pulse width or duty cycle of a switched DC-to-DC power supply. The system includes a first comparator coupled to the voltage to be regulated and to a reference voltage for generating an error signal. The error signal controls the duty cycle or pulse width of a PWM. A limiter circuit includes a further comparator which compares the error signal to a second reference voltage to generate a further limiting feedback signal for application to the first comparator. When the error signal tends to rise above a value established by the second reference voltage, the limiter applies a signal to the first comparator tending to reduce the error signal to thereby prevent the error signal from rising sufficiently to produce the undesired operating condition.

26 Claims, 6 Drawing Sheets

DYNAMIC DUTY CYCLE CLAMPING FOR SWITCHING CONVERTERS

CROSS REFERENCE TO RELATED APPLICATIONS

This application claims the benefit, pursuant to 35 USC §119, of earlier-filed U.S. Provisional Patent Application Ser. No. 60/451,576, entitled "Dynamic Duty Cycle Clamping for Switching Converters," filed on Mar. 3, 2003, the whole of which is incorporated by reference herein.

FIELD OF THE INVENTION

This application relates to the field of power supplies and, more specifically, to dynamically limiting the ratio of ON-time to OFF-time of a power switch in pulse-width modulated switching DC/DC converters.

BACKGROUND OF THE INVENTION

Pulse width modulated, or regulated, switched DC/DC power converters are well known in the art. In such power converters, numerous conditions may arise in which the modulating pulse duration undesirably exceeds a predetermined maximum value. Under these conditions, critical circuit components may be overstressed and may consequently fail to operate properly, or may even be degraded or fail. As one example of failure to operate properly, magnetic cores may become saturated by an excessive ON duration of a power switch, which may result in degradation of circuit performance, in turn resulting in poor voltage regulation. Methods for limiting or clamping the pulse width output to prevent overstressing or poor voltage regulation are known.

Figure 1A:
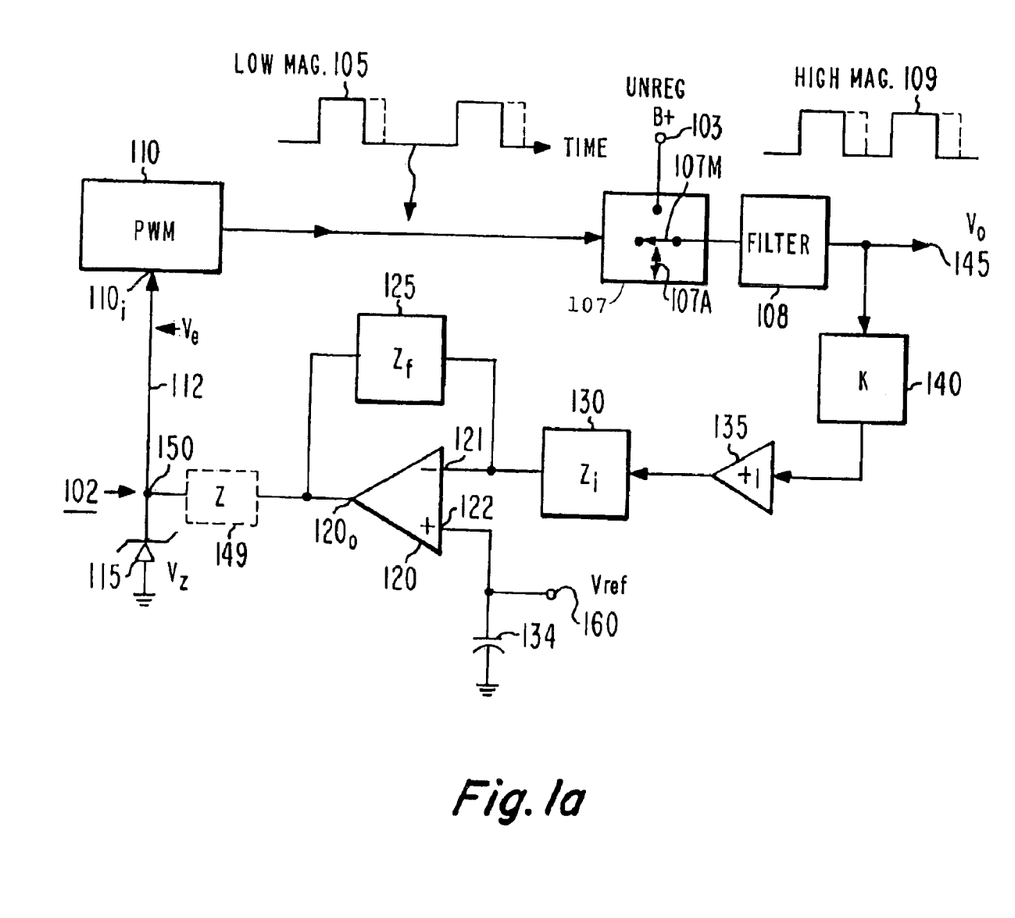
FIG. 1a illustrates one embodiment of a conventional regulator for a DC/DC voltage converter including a zener diode limiter.
Figure 1B:
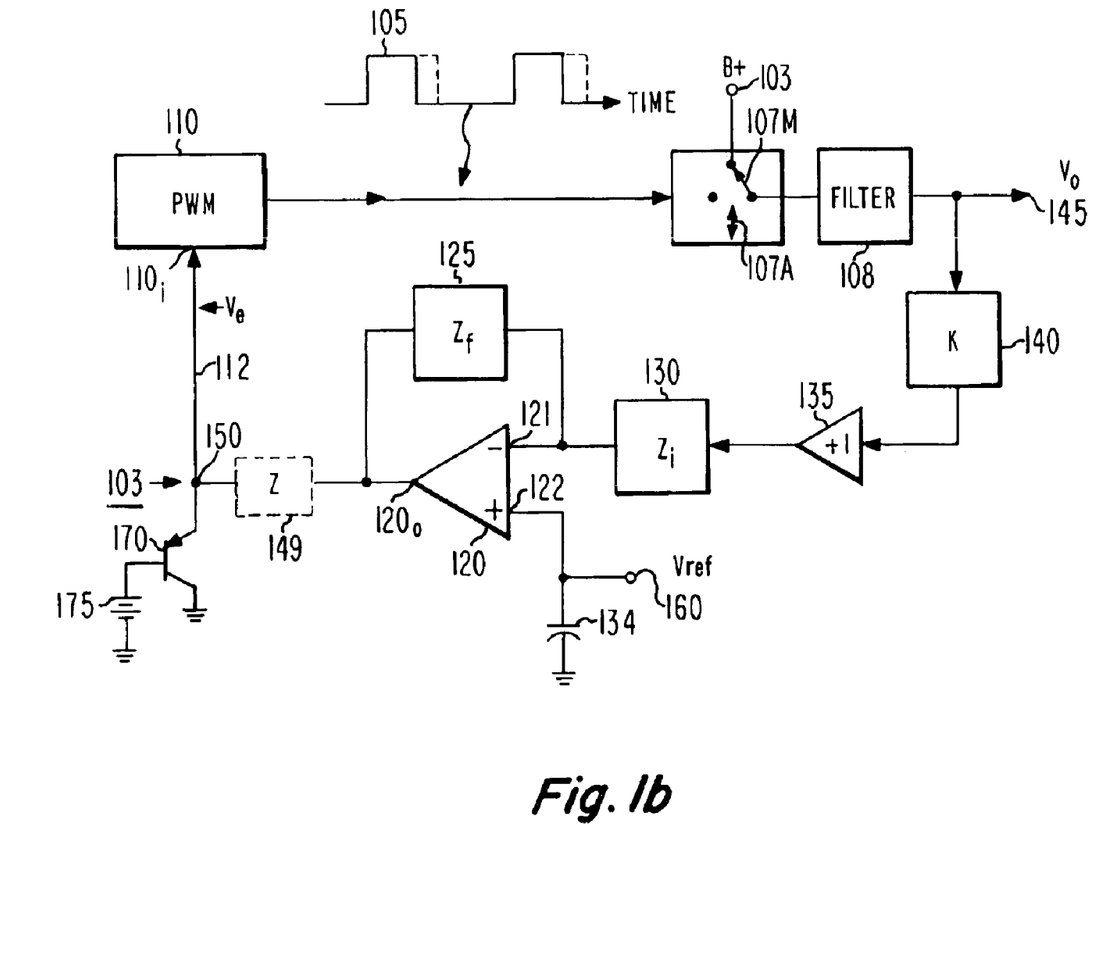
FIG. 1b is similar but uses a transistor limiter.

FIGS. 1a and 1b are representative of two generally similar methods for limiting or clamping the pulse width of a pulse width modulator to prevent component stress. FIG. 1a is a simplified circuit diagram of a DC/DC converter 100 using conventional regulation with clamped maximum duty cycle. In FIG. 1a, a pulse width modulator (PWM) 110 is controlled by the magnitude of an error signal or voltage $V_e$ applied to an input port 110i to produce pulses, illustrated as 105, having controlled duration or width. Such pulse width modulators often include an internal sawtooth- or triangle-signal generator and a comparator, for comparing the sawtooth with the applied error voltage, to generate variable-duration, low-magnitude pulses 105. The low-amplitude pulses 105 produced by PWM 110 of FIG. 1a drive a power amplifier or power switch illustrated as a block 107. As illustrated in block 107, the switch is represented by a mechanical movable switch element 107M which moves in the direction of double-headed arrow 107A under control of the low-level pulses 105, to periodically connect movable element M to a source 103 of unregulated voltage or B+. The resulting high magnitude pulses, illustrated in FIG. 1a as 109, are filtered by a filter, illustrated as 108, to produce direct voltage, and the resulting direct voltage is applied to an output port 145 as the desired output voltage $V_o$.

In FIG. 1a, the output voltage $V_o$ produced at output port 145 is coupled by way of an attenuator 140, a noninverting amplifier 135, and a comparator 120 input impedance 130 illustrated as a block Zi to the inverting (−) input port 121 of comparator 120. Those skilled in the art know that the input impedance of an input port of a comparator or amplifier is high. A reference voltage $V_{ref}$ is applied by way of a terminal 160 and a filter capacitor 134 to noninverting (+) input port 122 of comparator 120. Those skilled in the art know that a comparator is simply a high-gain amplifier, and may be considered to be such. A feedback impedance $Z_f$ 125 is coupled from the output port 120o of comparator 120 to inverting input terminal 121, for interacting with input impedance 130 for controlling the gain of the comparator. Comparator 120 in conjunction with its associated gain controlling resistors 125 and 130 produces an error signal or voltage $V_e$ at its output port 120o for application to input port 110i of PWM 110.

The error signal or voltage $V_e$ produced by comparator 120 of FIG. 1a is a measure of the deviation of the output voltage $V_o$ at terminal 145 from the desired value. The pulse width modulator 110 responds to changes in the value of the error voltage $V_e$ by adjusting the pulse width of pulses 105 in a manner which tends to reduce the difference, all as is well known in the art. The error voltage $V_e$ applied to pulse width modulator 110 may occasionally be of a magnitude which drives PWM 110 to produce a pulse or pulses of undesirably long duration. This might occur, for example, when the PWM is first turned ON, and the voltage at the output of filter 108 does not immediately respond to the pulses from PWM 110.

The arrangement of FIG. 1a includes an error voltage limiting circuit designated generally as 102, connected to conductor 112 at a location electrically between output port 120o of comparator 120 and input port 110i of PWM 110. As illustrated, the voltage limiter 102 includes a zener diode illustrated as 115, having a zener voltage $V_z$. When the error voltage $V_e$ attempts to rise above the zener voltage of zener diode 115, the zener diode conducts, and tends to limit the voltage rise. Those skilled in the art know that the operation of a limiter of this sort depends, at least in part, upon the impedance of the voltage source, and that it may be necessary or desirable to interpose a further impedance 149 between port 120o and node 150. With zener diode 115 in place, the error voltage which drives the pulse width modulator 110 is limited, and cannot achieve values which call for the undesired pulse widths.

While the arrangement of FIG. 1a is effective, it depends, at least in part, upon the availability of a zener diode which has a zener voltage $V_z$, or which conducts at an error voltage $V_e$, corresponding to the threshold between allowable and undesired pulse widths. However, zener diodes are produced only with discrete zener voltages, and a zener diode having the desired zener voltage may not be available. The arrangement of FIG. 1b is similar to that of FIG. 1a, but the voltage limiter 103 substitutes a transistor together with a voltage source for the zener diode of limiter 102 of FIG. 1a. In the arrangement of FIG. 1b, limiter 103 includes a bipolar PNP transistor having its emitter connected to node 150 and its collector grounded. A direct voltage source illustrated by a battery symbol 175 has its negative terminal grounded and its positive terminal connected to the base of transistor 170. The voltage of source 175 may be designated $V_m$. Transistor 170 will be nonconductive so long as the error voltage $V_e$ at node 150 does not exceed the sum of the voltage $V_m$ of source 175 plus one base-emitter voltage drop (one $V_{BE}$). When the error signal or voltage $V_e$ at node 150 exceeds $V_m+V_{BE}$, transistor 170 will conduct to limit the error voltage. The arrangement of FIG. 1b is advantageous by comparison with that of FIG. 1a because the limiting voltage of limiter 103 can be adjusted by simply adjusting the voltage of source 175.

In operation of the arrangements of either FIG. 1a or FIG. 1b, an increase of error voltage $V_e$ tends to increase the pulse width of the pulses produced by PWM 110. At some point during the increase of the error voltage, the limiter 102 or 103 becomes conductive, and prevents any further increase in the error voltage. Consequently, the error voltage can never reach a value such that the undesirably long pulse widths occur.

While these methods are commonly used to clamp the pulse width output, they suffer from long device recovery time when those conditions tending to cause the longer pulse widths are removed. For example, it is known that during a startup, greater pulse widths are produced by pulse width modulator 110 in order to quickly achieve the desired output voltage level. Elaborate schemes, referred to as soft-starts, have been developed to ensure a gradual increase in the operating duty cycle in order to prevent clamping or limiting from occurring. Absent soft-start mechanisms, transient operating conditions associated with the duty cycle may result in clamping at a maximum pulse width that extends over many tens of switching cycles and which unnecessarily overstress components.

Figure 1C:
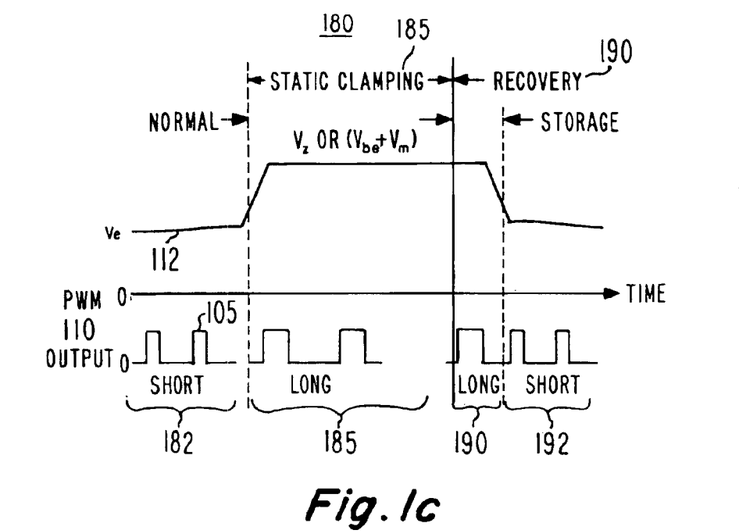
FIG. 1c illustrates voltage waveforms for an exemplary "static" clamping of the circuits shown in FIG. 1a or 1b.

FIG. 1c illustrates error voltage $V_e$ and the resulting pulse-width modulated pulses 105 (of FIG. 1a or 1b) during successive time periods of normal operation, during clamping, and during a post-clamping recovery period. In FIG. 1c, an interval of normal operation is designated as 182, which is a subset of times 180. During the interval 182 of normal operation, the error voltage $V_e$ illustrated by plot 112 takes on a range which may be viewed as a normal range. The pulses produced by PWM 110 of FIG. 1a or 1b have a nominal duration in interval 182. Region 185 represents a time during which the error voltage $V_e$ increases toward, and reaches, a limiting voltage. The limiting voltage is variously designated $V_z$ or ($V_{BE}$+Vm) to represent static (unchanging) zener-diode limiting or transistor limiting, respectively. The resulting pulse durations in region 185 are shown as wide. The condition causing the excessive error voltage $V_e$ is presumed to end at a time lying between time duration 185 and time duration 190. At this time, the error voltage should decrease to the normal region obtaining during the interval 182 of FIG. 1c. However, due to the characteristics of diodes and transistors, there is a recovery time in the interval 190 during which the clamped error voltage remains at the clamp level. Since, in the presence of such a long recovery time, the error voltage cannot decrease to the normal range rapidly during interval 190, at least a portion of the clamped value of error voltage $V_e$ in the interval 190 unnecessarily keeps the pulse width greater than it might otherwise be. After the recovery interval 190, the error voltage lies in the normal range.

Hence, there is a need for a method and apparatus for providing a clamping that provides for more rapid recovery once the event causing duty cycle clamping is removed.

SUMMARY OF THE INVENTION

An improvement for Pulse Width Modulation (PWM) regulation of DC/DC voltage converters according to an aspect of the invention, in which at least a sample of the regulated output voltage is provided to a first input port of a feedback network and a reference voltage is applied to a second input port of the feedback network. The feedback network produces an error signal for application to a pulse width modulator. The improvement comprises a second circuit responsive to the error signal and to a second reference voltage, for providing a further signal to the first input port of the feedback network when the error signal exceeds the second reference voltage, for tending to limit the error signal. In this aspect, a preferred embodiment includes an arrangement for isolating an output of the second circuit from the first input. The second circuit may include a comparator or a linear amplifier. In a more preferred embodiment, the second circuit includes a comparator or a linear amplifier having a first input and a second input. The second reference voltage may be variable. An arrangement may be provided for monitoring or making available the output of the second circuit.

A method according to an avatar of the invention is for providing dynamic clamping regulation in PWM regulated DC/DC converters. The method comprises the step of providing an error signal to a first input of a comparator through a first feedback circuit. At least a sample of a DC voltage to be regulated is applied to the first input and a reference voltage is applied to a second input of the comparator. A signal responsive to the error signal is independently provided to the first input by way of a second feedback circuit when the error signal is greater than a second reference voltage. In this avatar, the independently provided signal may be isolated from the first input during those times in which the error signal is not greater than the second reference voltage. The second reference voltage may be variable and/or varied.

In another hypostasis of the invention, a device provides dynamic clamping regulation in a PWM regulated DC/DC converter. The device comprises a first feedback circuit operable to provide a signal responsive to an output voltage of a first comparator to a first input of the first comparator. In this hypostasis, at least a sample of a DC voltage to be regulated is also applied to the first input and a reference voltage is applied to a second input of the first comparator. A second feedback circuit is operable when the output voltage of the first comparator is greater than a second reference voltage to independently provide to the first input port of the first comparator a signal responsive to a difference between the second reference voltage and the output voltage of the first comparator. In a preferred version of this hypostasis, the device includes an arrangement for isolating the second feedback circuit output from the first input of the comparator. The preferred version of the device also includes a second circuit having a first input and a second input operable to generate an output when the output voltage of the first comparator is greater than a second reference voltage applied to the second input. The second circuit may be selected from the group consisting of (a) linear amplifier and (b) comparator. Means may be provided for monitoring or making available the output signal of the second circuit. In one version of this hypostasis, the second reference voltage may be varied.

An avatar of the invention is for providing dynamic clamping voltage regulation. This avatar includes a first feedback circuit operable to couple or provide a first comparator output to a first input of the comparator. A voltage to be regulated is concurrently applied to the first input and a reference voltage is applied to a second input. A second feedback circuit is operable to independently provide to the first input a signal responsive to the first comparator output when the first comparator output is greater than a second reference voltage. This avatar may include means for isolating the second feedback circuit output from the first input. The second feedback circuit may include a circuit having a first input and a second input operable to generate an output signal when the first comparator output is greater than a second reference voltage applied to the second input of the circuit. The circuit may be selected from the group consisting of (a) linear amplifier and (b) comparator. This avatar may include means for monitoring or making available the output signal of the circuit. The second reference voltage may be varied. The voltage to be regulated may be the output of a DC/DC converter.

Thus, the invention relates to an improvement for regulation of Pulse Width Modulation (PWM) for DC/DC voltage converters wherein at least a sample of the output voltage to be regulated is provided to a first input or input port of a network, and a reference voltage is applied to a second input or input port of the network. The network includes a degenerative feedback circuit operative to provide an error signal to a pulse width modulator. The improvement comprises a second feedback circuit responsive to the error signal, for coupling a further signal to the first input port of the network when the error signal exceeds a second reference voltage. A particular embodiment of the improvement includes an isolator for isolating the further signal from the first input. The network may include a comparator or a linear amplifier.

In a particular version of the improvement, the second reference voltage is variable to allow a unique response.

This invention takes pulse-width modulated or regulated switched DC/DC power converters to a higher robustness in performance by taking the advantage of non-saturating limit-cycle.

BRIEF DESCRIPTION OF THE DRAWING

FIGS. 3a and 3b illustrate exemplary voltage waveforms corresponding to the voltage converter shown in FIG. 1a; and FIGS. 4a, 4b, and 4c illustrate exemplary voltage waveforms corresponding to the dynamically clamped converter shown in FIG. 2a.

It is to be understood that these drawings are solely for purposes of illustrating the concepts of the invention and are not intended as a definition of the limits of the invention. The embodiments shown in FIGS. 1 through 4c and described in the accompanying detailed description are to be used as illustrative embodiments and should not be construed as the only manner of practicing the invention. Also, the same reference numerals, possibly supplemented with reference characters where appropriate, have been used to identify similar elements.

DESCRIPTION OF THE INVENTION

Figure 2A:
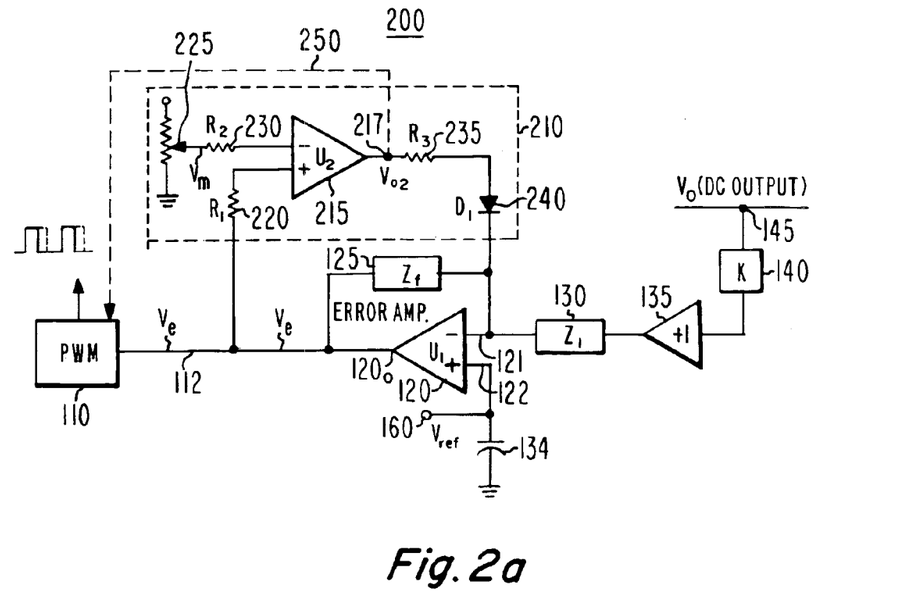
FIG. 2a illustrates an exemplary embodiment of a dynamically-clamped regulator for a DC/DC voltage converter in accordance with the principles of the invention.

FIG. 2a illustrates an exemplary embodiment of a dynamic clamping circuit 200 in accordance with the principles of the present invention. In this embodiment, a circuit 210 is electrically connected as a second feed-back network in parallel with feed-back network 125.

In this embodiment, the output voltage $V_e$ produced at output port 120o of comparator 120 is applied by way of a resistor 220 having a value of $R_1$ to the noninverting input port of a second comparator circuit 215 of clamping circuit 200. The error voltage $V_e$ produced at output port 120o of comparator 120 is compared in comparator 215 with a second reference voltage $V_m$ applied by way of a resistor 230 having a value of $R_2$ to the inverting input port of the comparator. Comparator circuit 215 responds to the comparison of the error voltage $V_e$ with second reference voltage $V_m$ to produce a voltage designated $V_{o2}$ at output port 217 of comparator circuit 215. The output voltage $V_{o2}$ produced at the output port 217 of comparator 215 is applied by way of a diode 240 and a resistor 235 having a value of $R_3$ to the inverting input port 121 of comparator 120. In a first embodiment of the arrangement of FIG. 2a, comparator 215 may be a linear amplifier, and in a second aspect of the invention, circuit 215 may be a comparator.

During normal operation of second feedback circuit 210 of FIG. 2a, the output voltage $V_{o2}$ of comparator circuit 215 remains at a nominally low value so long as the value of error signal or voltage $V_e$ 112 is less than the value of reference voltage ($V_m$) 225. When voltage $V_{o2}$ is lower or more negative than the voltage applied to the noninverting input port of comparator 120, diode 240 remains nonconductive. Thus, diode $D_1$ 240 operates as an isolator to ensure that the output voltage $V_{o2}$ of circuit 215 does not interfere with the operation of the networks $Z_i$ and $Z_f$ surrounding error amplifier or comparator 120 when comparator 215 finds that the error voltage $V_e$ is less than (more negative than) second reference voltage $V_m$. The use of diode $D_1$ 240 is further advantageous, in that it avoids the need to have output voltage $V_{o2}$ go to a value of zero volts when in a low state. Instead, voltage $V_{o2}$ can, in the low state, assume any value less than the sum of the voltage at noninverting input port 121 plus one $V_{BE}$. Hence, single-supply operation of circuit 215 is possible.

In operation of arrangement 200 of FIG. 2a, when error voltage $V_e$ (112 of FIG. 2b) exceeds reference voltage $V_m$ applied to terminal 225, the signal is amplified by amplifier/comparator 215 and its output voltage $V_{o2}$ becomes more positive. When voltage $V_{o2}$ becomes more positive by one diode voltage drop (one $V_{BE}$) than the voltage at port 121 of amplifier/comparator 120, diode 240 conducts, and the signal $V_{o2}$ is applied to high impedance port 121. The signal $V_{o2}$ may be viewed as being superposed over the signal from attenuator 140, inverter 135, and impedance 130, "overriding" or "swamping" the voltage which would otherwise appear at port 121. Thus, when the error voltage $V_e$ produced at output port 120o of amplifier/comparator 120 exceeds the value of reference voltage $V_m$, circuit 210 applies a superposing positive signal to the inverting input port of comparator 120. Application of this additional positive voltage to inverting input port 121 tends to drive the output voltage ($V_e$) of comparator 120 in a negative direction, or in opposition to the increase which caused the error voltage to exceed the value of $V_m$. This effectively limits the tendency of the error voltage to increase, much as though a conductive limiter 102 or 103 were used.

Figure 2B:
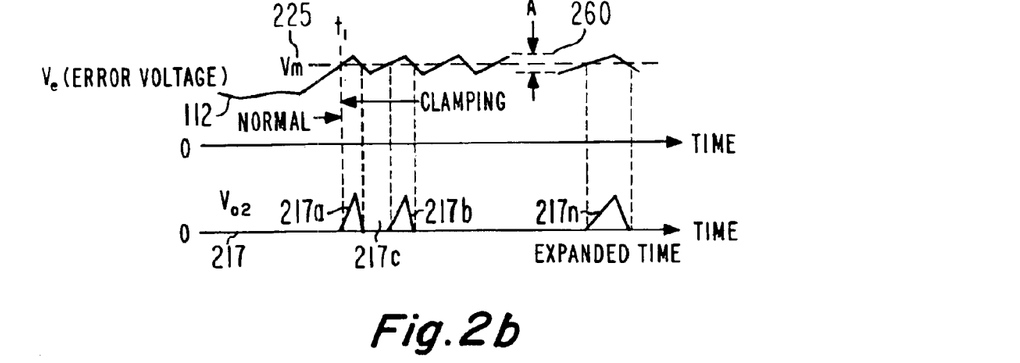
FIG. 2b illustrates voltage waveforms for one embodiment of dynamically clamped converter in accordance with the principles of the invention.

When diode 240 of FIG. 2a conducts, comparator circuit 120 and comparator circuit 215 are coupled together in a feedback loop, in which the output port 217 of comparator 215 is coupled to input port 121 of comparator 120, and in which output port 120o is coupled to the noninverting input port of comparator 215. FIG. 2b illustrates amplitude-time plots of the error voltage $V_e$ and its relation to reference voltage $V_m$, and the resulting clamping voltage $V_{o2}$ for the case in which the comparator 215 is an amplifier. In FIG. 2b, the reference voltage $V_m$ is designated 225, and the error voltage $V_e$ is designated 112. Prior to the time designated t1 in FIG. 2b, the error voltage is in a "normal" region in which it does not exceed voltage $V_m$. Beginning at about time t1 and continuing through the remainder of the illustrated interval, the error voltage may be considered to be in a limiting range. In the limiting range, the error voltage 112 shows a sawtooth "ripple" or oscillation centered about voltage $V_m$. It will be noted that there are intervals during this ripple during which the error voltage $V_e$ exceeds the reference voltage $V_m$, and other intervals in which the error voltage $V_e$ is less than the reference voltage $V_m$. During those intervals in which the error voltage $V_e$ exceeds the reference voltage $V_m$, the output voltage of comparator 215 of FIG. 2a on output port 217 is an amplified version of the input signal. If comparator/amplifier 215 were operated with both positive and negative direct voltage sources, its output voltage $V_{o2}$ during those intervals, such as interval 217c, in which the error voltage $V_e$ is less than the reference voltage $V_m$ would be a negative-going sawtooth similar to 217a. However, in the embodiment illustrated in FIG. 2a, comparator 215 is operated with a single-sided supply, so there is no amplification during times such as 217c of FIG. 2B, so its output voltage $V_{o2}$ is zero. Thus, voltage $V_{o2}$ assumes the separated-sawtooth form illustrated in FIG. 2b.

Thus, FIG. 2b illustrates an example of dynamic clamping regulation in accordance with the principles of the invention. As shown in FIG. 2b, voltage ($V_e$) 112 remains at a relatively nominal value similar to that shown in FIG. 1c. When an event or condition (not shown) occurs which tends to cause voltage $V_e$ 112 to increase, the duration or width of pulses output by PWM 110 also tends to increase, as described in conjunction with FIG. 1c. When voltage $V_e$ 112 is below or more negative than second reference voltage $V_m$ 225, the output $V_{o2}$ 217 of network 210 remains relatively low (in this illustrated case at zero volts because of single-supply operation) and network 210 is essentially isolated from comparator 120 by the non-conducting state of diode $D_1$ 240. However, as voltage $V_e$ 112 tends to exceed voltage $V_m$ 225, output 217 correspondingly increases, as represented by voltage 217a of FIG. 2b and, in turn, places $D_1$ 240 in a conducting state. In this situation, circuit 215 is a linear amplifier, and voltage 217a is proportional to the amount by which voltage $V_e$ 112 is greater than voltage ($V_m$) 225.

As the output signal $V_{o2}$ (217 of FIG. 2b) is applied to inverting input port 121 of comparator 120 of FIG. 2a, the combined input applied to input port 121 causes the output of comparator 120 to decrease, and the value of voltage $V_e$ 112 falls below the value of voltage $V_m$ 225. This creates a regenerative oscillation of the error voltage $V_e$ about the value of reference voltage $V_m$.

Accordingly, as the condition causing excessive error voltage $V_e$ 112 persists, the value of the voltage $V_e$ 112 swings or oscillates about voltage $V_m$ 225. Again the output $V_{o2}$ of comparator 215 of FIG. 2a, represented as voltage 217a of FIG. 2b, increases proportionally to the difference between $V_e$ 112 and $V_m$ 225. Meanwhile, the output pulse width of PWM 110 is also forced to decrease or expand cyclically about an average value.

Figure 2C:
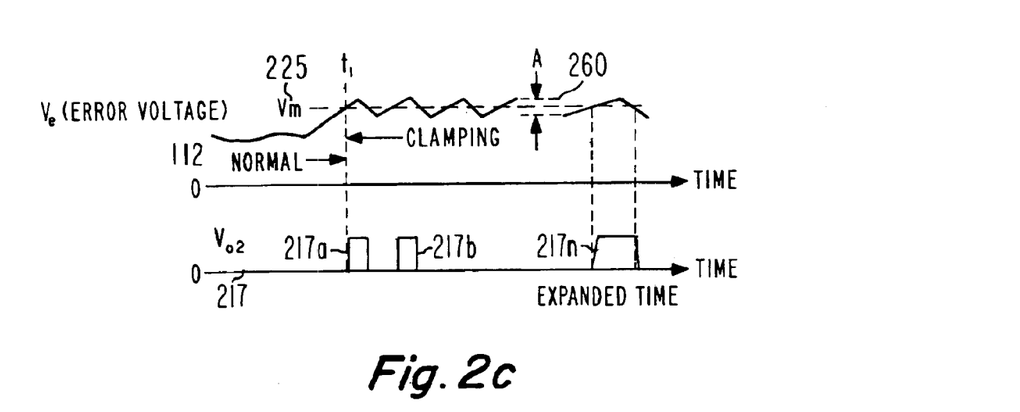
FIG. 2c illustrates voltage waveforms for a second embodiment of dynamically clamped converter in accordance with the principles of the invention.

FIG. 2c illustrates a second example of dynamic clamping in accordance with the principles of the invention. In this case, circuit 215 is representative of a high-speed voltage comparator as opposed to an amplifier. The difference between these two may be considered to be that the comparator has such high gain that its output goes to a saturated level at any finite value of input signal. Thus, a comparator may be considered to have a maximum output voltage of one polarity when the input voltage is above a reference value, and a maximum voltage of the opposite polarity when the input voltage is below the reference value. Thus, a comparator used in place of an amplifier as element 215 of FIG. 2a will produce a saturated, fixed-value output voltage whenever voltage $V_e$ 112 is greater than voltage $V_m$ 225. The generation of a fixed or discrete output from circuit 215 is similar to that disclosed with regard to FIG. 2b and need not be discussed again in detail.

As shown in FIGS. 2b and 2c, the amplitude of the ripple of error voltage 112 about $V_m$ (the depth of excursion) is centered around voltage $V_m$ 225. In this case there is a cyclic reduction of the effective average duty cycle of the modulating pulses generated by PWM 110. However, in another aspect (not shown), the depth of excursion 260 may be a swing between zero volts and voltage $V_m$ 225. In this case, periodic suppression of a group of modulating pulses will occur in addition to a periodic reduction of the average duty cycle. In this aspect, the time period may be in the order of milliseconds and is dependent upon the delay properties of amplifier 120 and feedback network 125.

Returning to FIG. 2a, it should be appreciated that voltage $V_{o2}$ appearing at port 217 of comparator 215 may be made available to pulse width modulator 110, as for example by way of a conductor designated 250, for monitoring of voltage 217 or for providing feedback to PWM 110.

Figure 3A:
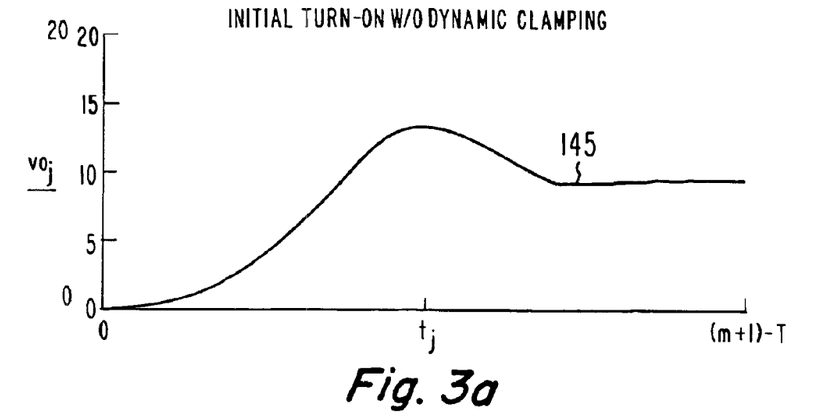
Figure 3B:
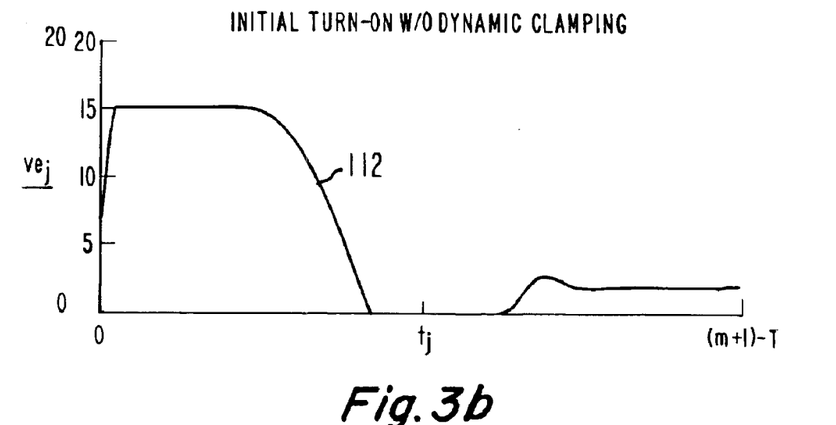

FIGS. 3a and 3b illustrate the direct output voltage $V_o$ generated at output terminal 145, and the corresponding error voltage $V_e$ 112 waveforms at initial turn-on for a pulse width modulated DC/DC converter as shown in FIG. 1a. In the situation illustrated in FIGS. 3a and 3b, as $V_o$ 145 begins to increase from zero volts, error voltage $V_e$ 112 rises to a maximum value, in this case 15 volts. As output voltage $V_o$ 145 increases above its set value, in this case 10 volts, the voltage $V_e$ 112 decreases to zero. Voltage $V_e$ 112 remains at zero volts during those times in which output voltage $V_o$ 145 is greater than the required 10 volts (i.e. during overshoot). As voltage 145 finally approaches the desired 10 volts after the overshoot, voltage 112 increases to a nominal value to stabilize voltage $V_o$ 145 at a desired 10 volts value.

Figure 4A:
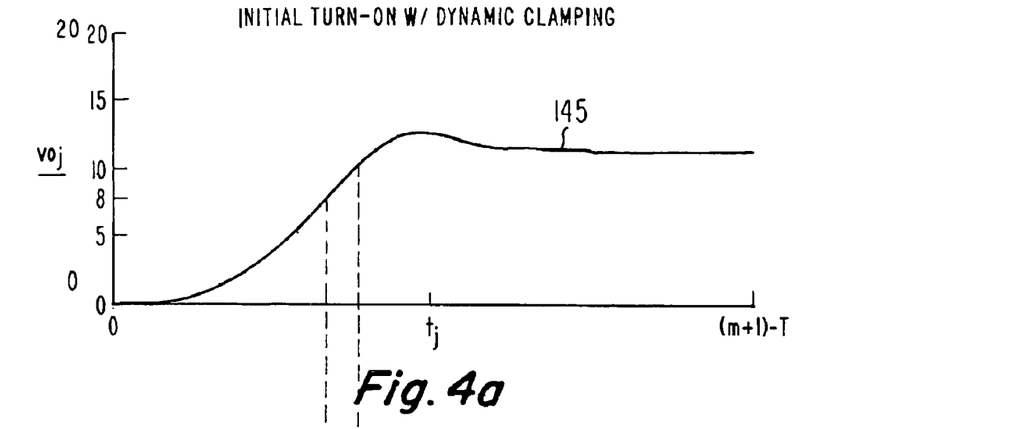
Figure 4B:
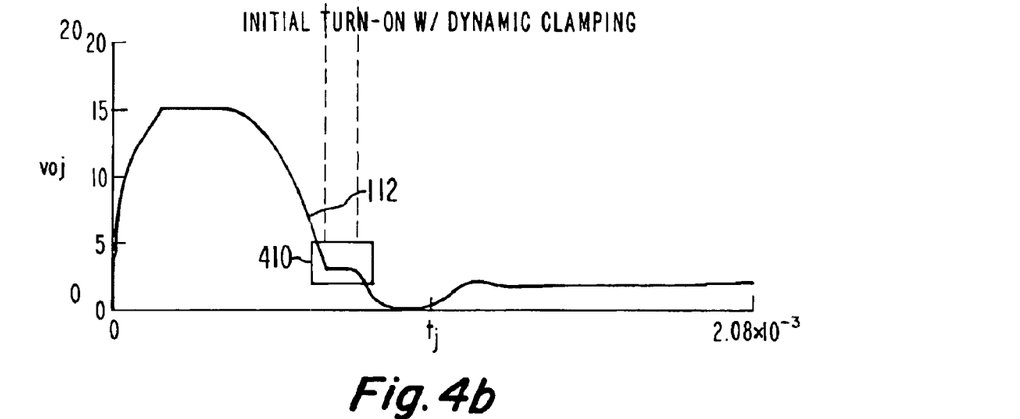

FIGS. 4a and 4b illustrate the output $V_o$ 145 and the error voltage $V_e$ 112 waveforms at initial turn-on for a PWM DC/DC converter as shown in FIG. 2a. In this case, similar to that shown in FIG. 3a, as output voltage $V_o$ 145 increases from zero volts, error voltage $V_e$ 112 rises to a maximum value, since voltage $V_o$ 145 is below a capture range and the dynamic clamping is not invoked. As output voltage $V_o$ 145 increases toward the intended regulation value of 10 volts, dynamic clamping occurs and captures error voltage $V_e$ 112.

When output voltage $V_o$ at output terminal 145 is below the capture range, in this case below about 8 to 10 volts, voltage $V_{o2}$ at point 217 (the output of comparator/amplifier 215) is high. However, the superpositioning of a high $V_{o2}$ and a low $V_o$ is less than the reference voltage $V_{ref}$ at terminal 160. In this case $V_e$ 112 is therefore determined by the supply for the device 120 rather than the reference voltage $V_m$.

Figure 4C:
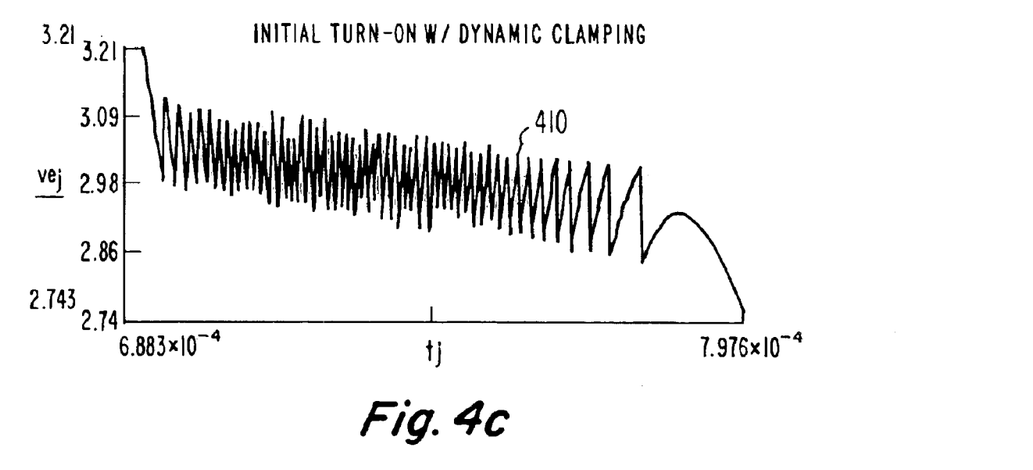

FIG. 4c represents region 410 of FIG. 4b, expanded in both coordinates to better illustrate the oscillation caused by dynamic clamping shown in FIG. 4b.

While there has been shown, described, and pointed out fundamental novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention. It is expressly intended that all combinations of those elements that perform substantially the same function in substantially the same way to achieve the same results, even though the processes differ in name, form or shape, are within the scope of the invention. Substitutions of elements from one described embodiment to another are also fully intended and contemplated.

Many prior-art control systems may experience transients or other out-of-range conditions which result in saturation. When a portion of a control loop is saturated, the loop is, in effect, open. In other words, the control loop loses control of the controlled parameter(s). According to an aspect of the invention, the dynamic error signal clamping of the control loop tends to avoid saturation, and therefore tends to maintain its control, and regains total control rapidly after a perturbation.

Other embodiments of the invention will be apparent to those skilled in the art. For example, the invention may be used in most closed-loop control systems, as for example in a phase-lock loop.

An improvement for Pulse Width Modulation (PWM) regulation of DC/DC voltage converters (200) according to an aspect of the invention, in which at least a sample of the regulated output voltage ($V_o$) is provided to a first input port (121) of a feedback network (120, 125) and a reference voltage ($V_{ref}$) is applied to a second (+) input port (122) of the feedback network (120, 125). The feedback network (120, 125) produces an error signal ($V_e$) for application to a pulse width modulator (110). The improvement comprises a second circuit (250) responsive to the error signal ($V_e$) and to a second reference voltage ($V_m$), for providing a further signal ($V_{o2}$) to the first input port (121) of the feedback network (120, 125) when the error signal ($V_e$) exceeds the second reference voltage ($V_m$), for tending to limit the error signal ($V_e$). In this aspect, a preferred embodiment includes an arrangement ($D_1$) for isolating an output of the second circuit (215) from the first input (121). The second circuit (215) may include a comparator or a linear amplifier. In a more preferred embodiment, the second circuit (215) includes a comparator or a linear amplifier having a first input (+) and a second (–) input. The second reference voltage ($V_m$) may be variable. An arrangement (250) may be provided for monitoring or making available the output of the second circuit (215).

A method according to an avatar of the invention is for providing dynamic clamping regulation in PWM regulated DC/DC converters. The method comprises the step of providing an error signal ($V_e$) to a first input (121) of a comparator (120) through a first feedback circuit (125). At least a sample of a DC voltage ($V_o$) to be regulated is applied to the first input (121) and a reference voltage ($V_{ref}$) is applied to a second input (122) of the comparator (120). A signal ($V_{o2}$) responsive to the error signal ($V_e$) is independently provided to the first input (121) by way of a second feedback circuit (210) when the error signal ($V_e$) is greater than a second reference voltage ($V_m$). In this avatar, the independently provided signal ($V_{o2}$) may be isolated from the first input (121) during those times in which the error signal ($V_e$) is not greater than the second reference voltage ($V_m$). The second reference voltage may be variable andor varied.

In another hypostasis of the invention, a device provides dynamic clamping regulation in a PWM regulated DC/DC converter. The device comprises a first feedback circuit (125) operable to provide a signal ($V_{o2}$) responsive to an output voltage ($V_e$) of a first comparator (120) to a first input (121) of the first comparator (120). In this hypostasis, at least a sample of a DC voltage ($V_o$) to be regulated is also applied to the first input (121) and a reference voltage ($V_{ref}$) is applied to a second input (122) of the first comparator (120). A second feedback circuit (210) is operable when the output voltage ($V_e$) of the first comparator (120) is greater than a second reference voltage ($V_m$) to independently provide to the first input port (121) of the first comparator (120) a signal responsive to a difference between the second reference voltage ($V_m$) and the output voltage ($V_e$) of the first comparator (120). In a preferred version of this hypostasis, the device includes an arrangement (D1) for isolating the second feedback circuit (210) output ($V_{o2}$) from the first input (121) of the comparator (210). The preferred version of the device also includes a second circuit (215) having a first input (+) and a second input (–) operable to generate an output when the output voltage ($V_e$) of the first comparator (120) is greater than a second reference voltage ($V_m$) applied to the second input (–). The second circuit may be selected from the group consisting of (a) linear amplifier and (b) comparator. Means may be provided for monitoring or making available the output signal ($V_{o2}$) of the second circuit. In one version of this hypostasis, the second reference voltage ($V_m$) may be varied.

An avatar of the invention is for providing dynamic clamping voltage regulation. This avatar includes a first feedback circuit (120, 125) operable to couple or provide a first comparator (120) output ($V_e$) to a first input (121) of the comparator (120). A voltage ($V_o$) to be regulated is concurrently applied to the first input (121) and a reference voltage ($V_{ref}$) is applied to a second input (122). A second feedback circuit (210) is operable to independently provide to the first input (121) a signal ($V_{o2}$) responsive to the first comparator (120) output ($V_e$) when the first comparator (120) output ($V_e$) is greater than a second reference voltage ($V_m$). This avatar may include means for isolating the second feedback circuit output from the first input. The second feedback circuit (210) may include a circuit (215) having a first input (+) and a second input (–) operable to generate an output signal ($V_{o2}$) when the first comparator (120) output ($V_{err}$) is greater than a second reference voltage ($V_m$) applied to the second input (–) of the circuit (215). The circuit (215) may be selected from the group consisting of (a) linear amplifier and (b) comparator. This avatar may include means for monitoring or making available the output signal ($V_{o2}$) of the circuit (215). The second reference voltage ($V_m$) may be varied. The voltage to be regulated may be the output of a DC/DC converter.

What is claimed is:

1. An improvement for Pulse Width Modulation (PWM) regulation for DC/DC voltage converters wherein at least a sample of the regulated output voltage is provided to a first input port of a feedback network and a reference voltage is applied to a second input port of said feedback network, said network producing an error signal for application to a pulse width modulator, said improvement comprising:
   a second circuit responsive to said error signal and to a second reference voltage, for providing a further signal to said first input port of said feedback network when said error signal exceeds said second reference voltage, for tending to limit said error signal.

2. An improvement for Pulse Width Modulation (PWM) regulation for DC/DC voltage converters wherein at least a sample of the regulated output voltage is provided to a first input port of a feedback network and a reference voltage is applied to a second input port of said feedback network, said network producing an error signal for application to a pulse width modulator, said improvement comprising:
   a second circuit responsive to said error signal and to a second reference voltage, for providing a further signal to said first input port of said feedback network when said error signal exceeds said second reference voltage, for tending to limit said error signal; and further comprising:

means for isolating an output of said second circuit from said first input.

3. The improvement as recited in claim 1, wherein said network comprises a comparator having a first input and a second input.

4. The improvement as recited in claim 1, wherein said second circuit includes a linear amplifier.

5. The improvement as recited in claim 1, wherein said second circuit includes a comparator having a first input and a second input.

6. An improvement for Pulse Width Modulation (PWM) regulation for DC/DC voltage converters wherein at least a sample of the regulated output voltage is provided to a first input port of a feedback network and a reference voltage is applied to a second input port of said feedback network, said network producing an error signal for application to a pulse width modulator, said improvement comprising:

a second circuit responsive to said error signal and to a second reference voltage, for providing a further signal to said first input port of said feedback network when said error signal exceeds said second reference voltage, for tending to limit said error signal; and wherein said second reference voltage is variable.

7. The improvement as recited in claim 1, further comprising:

means for monitoring the output signal of said second circuit.

8. The improvement as recited in claim 1, further comprising:

means for making the output signal of said second circuit available.

9. A method for providing dynamic clamping regulation in PWM regulated DC/DC converters, said method comprising the steps of:

providing an error signal to a first input of a comparator through a first feedback circuit, wherein at least a sample of a DC voltage to be regulated is applied to said first input and a reference voltage is applied to a second input of said comparator; and independently providing a signal responsive to said error signal to said first input by way of a second feedback circuit when said error signal is greater than a second reference voltage.

10. A method for providing dynamic clamping regulation in PWM regulated DC/DC converters, said method comprising the steps of:

providing an error signal to a first input of a comparator through a first feedback circuit, wherein at least a sample of a DC voltage to be regulated is applied to said first input and a reference voltage is applied to a second input of said comparator; and independently providing a signal responsive to said error signal to said first input by way of a second feedback circuit when said error signal is greater than a second reference voltage; and further comprising the step of:

isolating said independently provided signal from said first input during those times in which said error signal is not greater than said second reference voltage.

11. A method for providing dynamic clamping regulation in PWM regulated DC/DC converters, said method comprising the steps of:

providing an error signal to a first input of a comparator through a first feedback circuit, wherein at least a sample of a DC voltage to be regulated is applied to said first input and a reference voltage is applied to a second input of said comparator; and independently providing a signal responsive to said error signal to said first input by way of a second feedback circuit when said error signal is greater than a second reference voltage; and wherein said second reference voltage is variable.

12. A device for providing dynamic clamping regulation in PWM regulated DC/DC converters, said device comprising:

a first feedback circuit operable to provide a signal responsive to an output voltage of a first comparator to a first input of said comparator, wherein at least a sample of a DC voltage to be regulated is also applied to said first input and a reference voltage is applied to a second input of said comparator; and a second circuit operable when said output voltage of said first comparator is greater than a second reference voltage to independently provide to said first input port of said first comparator a signal responsive to a difference between said second reference voltage and said output voltage of said first comparator.

13. A device for providing dynamic clamping regulation in PWM regulated DC/DC converters, said device comprising:

a first feedback circuit operable to provide a signal responsive to an output voltage of a first comparator to a first input of said comparator, wherein at least a sample of a DC voltage to be regulated is also applied to said first input and a reference voltage is applied to a second input of said comparator;

a second circuit operable when said output voltage of said first comparator is greater than a second reference voltage to independently provide to said first input port of said first comparator a signal responsive to a difference between said second reference voltage and said output voltage of said first comparator; and further comprising:

means for isolating said second circuit output from said first input of said comparator.

14. The device as recited in claim 12, wherein said second circuit comprises:

a circuit having a first input and a second input operable to generate an output when said output voltage of said first comparator is greater than a second reference voltage applied to said second input.

15. The device as recited in claim 14, wherein said circuit is selected from the group consisting of: linear amplifier, comparator.

16. The device as recited in claim 12, further comprising:

means for monitoring said circuit output.

17. The device as recited in claim 12, further comprising:

means for making said circuit output available.

18. A device for providing dynamic clamping regulation in PWM regulated DC/DC converters, said device comprising:

a first feedback circuit operable to provide a signal responsive to an output voltage of a first comparator to a first input of said comparator, wherein at least a sample of a DC voltage to be regulated is also applied to said first input and a reference voltage is applied to a second input of said comparator;

a second circuit operable when said output voltage of said first comparator is greater than a second reference voltage to independently provide to said first input port of said first comparator a signal responsive to a difference between said second reference voltage and said output voltage of said first comparator; and wherein said second reference voltage may be varied.

19. A device for providing dynamic clamping voltage regulation comprising:

a first feedback circuit operable to provide a first comparator output to a first input of said comparator, wherein a voltage to be regulated is concurrently applied to said first input and a reference voltage is applied to a second input; and a second feedback circuit operable to independently provide a signal responsive to said first comparator output to said first input when said first comparator output is greater than a second reference voltage.

20. A device for providing dynamic clamping voltage regulation, said device comprising:

a first feedback circuit operable to provide a first comparator output to a first input of said comparator, wherein a voltage to be regulated is concurrently applied to said first input and a reference voltage is applied to a second input;

a second feedback circuit operable to independently provide a signal responsive to said first comparator output to said first input when said first comparator output is greater than a second reference voltage; and further comprising:

means for isolating said second feedback circuit output from said first input.

21. The device as recited in claim 19, wherein said second feedback circuit comprises:

a circuit having a first input and a second input operable to generate an output signal when said first comparator output is greater than a second reference voltage applied to said second input of said circuit.

22. The device as recited in claim 21, wherein said circuit is selected from the group consisting of: linear amplifier, comparator.

23. The device as recited in claim 19, further comprising:

means for monitoring said circuit output.

24. The device as recited in claim 19, further comprising:

means for making said circuit output available.

25. A device for providing dynamic clamping voltage regulation, said device comprising:

a first feedback circuit operable to provide a first comparator output to a first input of said comparator, wherein a voltage to be regulated is concurrently applied to said first input and a reference voltage is applied to a second input;

a second feedback circuit operable to independently provide a signal responsive to said first comparator output to said first input when said first comparator output is greater than a second reference voltage; and wherein said second reference voltage may be varied.

26. The device as recited in claim 19, wherein said voltage to be regulated is a DC/DC converter voltage.

* * * * *